Nov. 8, 1949  B. L. EASTMAN  2,487,226
DIAPHRAGM VALVE
Filed Feb. 19, 1945
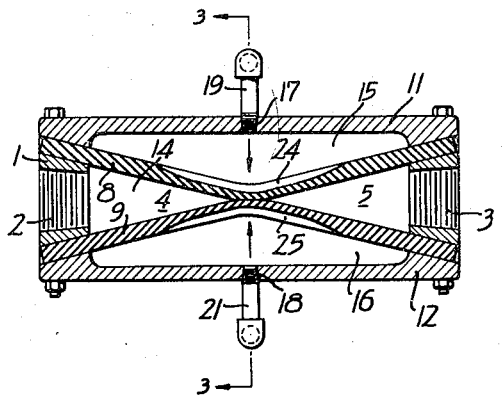
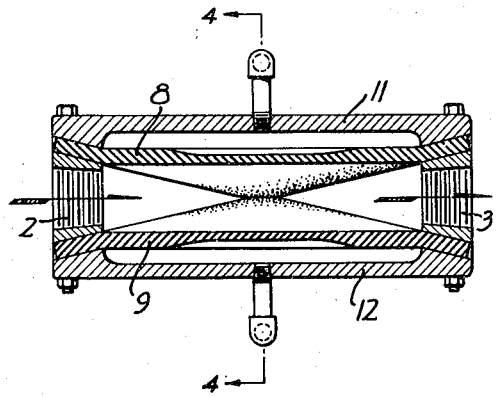
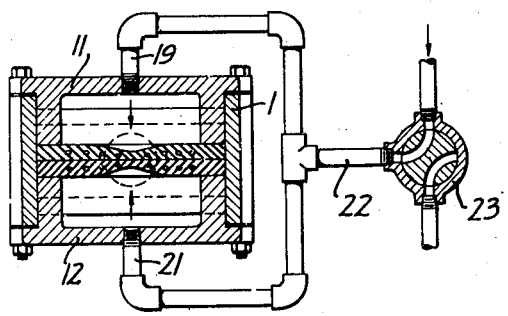
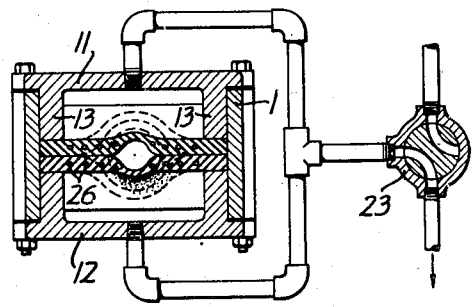
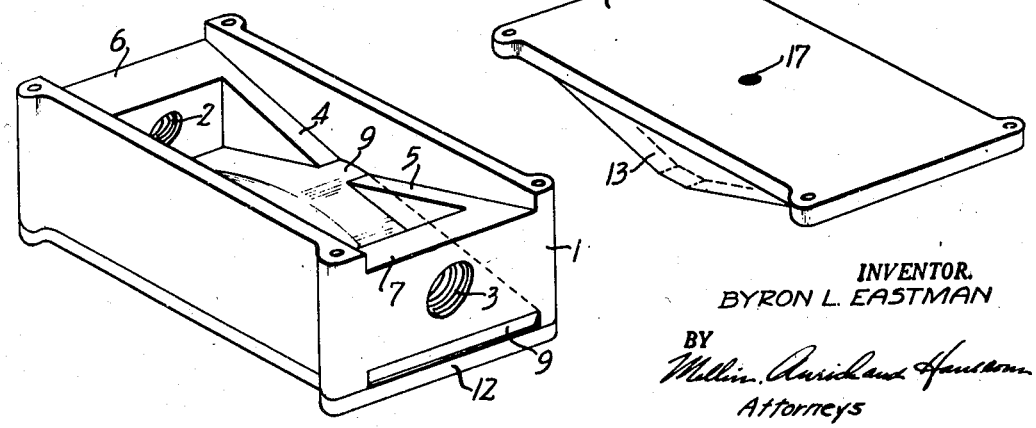
INVENTOR.
BYRON L. EASTMAN
BY
Attorneys Patented Nov. 8, 1949

2,487,226

UNITED STATES PATENT OFFICE 2,487,226

DIAPHRAGM VALVE

Byron L. Eastman, San Francisco, Calif.

Application February 19, 1945, Serial No. 578,722

7 Claims. (Cl. 137—153)

This invention relates in general to fluid valves and more particularly to a slurry diaphragm valve.

The problems involved in designing valves for handling slurries differ radically from those involved in designing valves for handling clear liquids, largely because slurries contain a relatively large quantity of solids and the solid particles may vary considerably in size. For this reason resort has been made to flexible diaphragm valves with the thought that the diaphragms can be made to conform to and effect a seal over any particle which may be present in the valve when it is closed. Frequently, however, it is desired to insert a valve in a pipe line, not only for the purpose of completely closing off the line, but merely for restricting or controlling the flow therein to any desired extent. Insofar as I am aware, there is no valve now available capable of performing this latter function effectively, for in all valves of this type the valve passageway assumes the form of a narrow slit as it approaches its closed position, and consequently immediately becomes plugged and prevents the complete closure of the valve.

In general, the object of this invention is the provision of a slurry valve wherein the valve opening defined by two opposed diaphragms can be maintained substantially circular in form in any position of the valve, other than its fully closed position, so that clogging of the valve opening is avoided.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Fig. 1 is a longitudinal vertical mid-section of a diaphragm valve embodying the objects of my invention and shown in its closed position;

Fig. 2 is a view similar to Fig. 1, but showing the valve in its fully open position;

Fig. 3 is a vertical mid-section taken on the line 3—3 of Fig. 1;

Fig. 4 is a vertical mid-section taken on the line 4—4 of Fig. 2, but showing the valve in an intermediate position in full lines and fully open in dotted lines;

Fig. 5 is an isometric view of the valve with its top diaphragm and top cover plate removed; and Fig. 6 is an isometric view of the top cover plate, the bottom cover plate being identical therewith.

As shown in these various views, the objects of my invention have been embodied in a valve comprising a generally rectangular valve body or casing 1 formed at either end with threaded inlet and outlet slurry ports 2 and 3. Cast integral with the casing are two opposed pairs of inwardly converging, centrally spaced, wedge-shaped ledges 4 and 5, and seated on the end walls 6 and 7 of the casing and on the opposed pairs of ledges 4 and 5 is a pair of opposed flexible diaphragms 8 and 9. Bolted to the top and bottom of the casing 1 are top and bottom plates 11 and 12, each formed with side walls 13 complementary to and overlying the ledges 4 and 5 and by means of which the sides and ends of diaphragms 8 and 9 are sealed to the casing and to its top and bottom.

From this construction it will be observed that the diaphragms 8 and 9 are sealed to each other at the intermediate portions of their sides but with their central intermediate portions only in normally relaxed contact with each other, and with their ends outwardly diverging so as to form between them a slurry passageway 14 communicating with the ports 2 and 3 and normally closed intermediate its ends. Also defined by the diaphragms 8 and 9 and the casing 1 and its top and bottom are a pair of opposed fluid chambers 15 and 16. Both the top and bottom members 11 and 12 are provided with threaded ports 17 and 18 for the reception of nipples 19 and 21, which in turn communicate, through suitable piping, with a fluid line 22. Communicating with the line 22 is a two-way valve 23 by which the fluid chambers 15 and 16 can be subjected to superatmospheric pressure, atmospheric pressure or subatmospheric pressure, as desired.

It is to be particularly noted that the intermediate portions 24 and 25 of the diaphragms 8 and 9 are of reduced thickness so as to make them more resilient over their central portions. By properly correlating the elasticity, wall thickness and width of the diaphragms at these areas, it is possible to obtain a structure wherein the valve opening defined by the diaphragms is always of substantially circular form except when the diaphragms are fully closed upon each other, as shown in Figs. 1 and 3. It is, therefore, apparent that in a valve of this type advantage has been taken of the fact that for any given perimeter a circle gives a greater area than any other contour.

Conveniently, the diaphragms 8 and 9 can be made of rubber reinforced with a fabric 26.

With the fluid chambers 15 and 16 under atmospheric pressure, slurry delivered to the intake port 2 under any pressure greater than atmospheric will cause the diaphragms 8 and 9 to dilate in circular form, consequently to permit the passage of slurry therethrough and through the outlet port 3. If it is desired to restrict the flow of slurry through the valve, the fluid chambers 15 and 16 are subjected to any desired fluid pressure so as to control the opening defined by the opposed diaphragms 8 and 9, or to completely seal them in contact with each other.

As herein used, the term "slurry" is to be considered not only as referring to solids suspended in a liquid vehicle, but also to dry solids in a fluid state.

I claim:

1. A slurry valve comprising a casing having opposed top and bottom walls, opposed side walls and opposed end walls; a pair of opposed flexible diaphragms accommodated within said casing; means for sealing the lateral edges of said diaphragms to the side walls of said casing along opposed, inwardly converging and meeting lines; means for sealing the corresponding end edges of said diaphragms to the end walls of said casing along spaced lines; said diaphragms and side walls defining a slurry passageway normally closed intermediate its ends and said diaphragms, side, top and bottom walls defining a pair of opposed fluid chambers; means for establishing communication between each of said fluid chambers and a source of fluid; and inlet and outlet ports provided in the opposed ends of said slurry passageway.

2. A slurry valve comprising a casing formed on each of its opposed end walls with a slurry port and on each of its two opposed side walls with a fluid port; a pair of opposed flexible diaphragms accommodated within said casing; means for sealing the lateral edges of said diaphragms to said side walls along opposed inwardly converging and meeting lines; and means for sealing the corresponding end edges of said diaphragms to said end walls on opposite sides of said slurry ports; said diaphragms and side walls defining a slurry passageway normally closed intermediate its ends by overlying portions of said diaphragms, and said diaphragms defining with the side, top and bottom walls of said casing a pair of opposed fluid chambers.

3. A slurry valve comprising a casing formed on each of its opposed end walls with a slurry port and on each of two opposed side walls with a fluid port; a pair of opposed flexible diaphragms accommodated within said casing, said diaphragms being of reduced thickness centrally thereof; means for sealing the lateral edges of said diaphragms to said side walls along opposed inwardly converging lines so that the inner intermediate surfaces of said diaphragms normally are in relaxed engagement with each other; and means for sealing the corresponding end edges of said diaphragms to said end walls on opposite sides of said slurry ports; said diaphragms and side walls defining a normally closed slurry passageway, and said diaphragms defining with the side, top and bottom walls of said casing a pair of opposed fluid chambers.

4. A slurry valve comprising: a fluid passageway including a pair of overlying flexible diaphragms having opposed portions arranged for surface engagement with each other along a line transverse to said passageway, one of said diaphragms being of a thickness which progressively increases from the center of, and along said line in both directions thereof; and means for compressing said diaphragms along said line.

5. A slurry valve comprising: a fluid passageway including a pair of overlying flexible diaphragms having opposed portions arranged for surface engagement with each other along a line transverse to said passageway, the lateral edges of said diaphragm being sealed to each other at the intersection therewith of said line, and one of said diaphragms being of a thickness which progressively increases from the center of, and along said line in both directions thereof; and means for compressing said diaphragms along said transverse line so as to effect a seal therebetween.

6. A fluid valve comprising: a fluid passageway having an inlet and outlet; a pair of overlying flexible diaphragms interposed in said passageway and between which fluid must pass in going from said inlet to said outlet, said diaphragms having opposed portions intermediate their ends arranged for surface engagement with each other along a line transverse to said passageway, the lateral edges of said diaphragms being sealed to each other at the intersection therewith of said line; one of said diaphragms being of a thickness which progressively increases from the center of, and along said line in both directions thereof; and means for compressing said diaphragms along said transverse line for controlling the opening formed therebetween.

7. A fluid valve comprising: a fluid passageway having an inlet and an outlet; a pair of overlying flexible diaphragms interposed in said passageway and between which fluid must pass in going from said inlet to said outlet, said diaphragms having opposed portions intermediate their ends arranged for surface engagement with each other along a line transverse to said passageway, the lateral edges of said diaphragms being sealed to each other at the intersection therewith of said line; both of said diaphragms being of a thickness which progressively increases from the center of, and along said line in both directions thereof; and means for compressing said diaphragms along said transverse line for controlling the opening formed therebetween.

BYRON L. EASTMAN.

REFERENCES CITED

The following references are of record in the file of this patent:

UNITED STATES PATENTS

| Number | Name | Date |
|---|---|---|
| 994,167 | Koppitz | June 6, 1911 |
| 2,026,916 | Smith | Jan. 7, 1936 |
| 2,331,291 | Annin | Oct. 12, 1943 |
| 2,347,988 | Burke | May 2, 1944 |

FOREIGN PATENTS

| Number | Country | Date |
|---|---|---|
| 504,449 | Germany | Aug. 4, 1930 |
| 540,685 | Great Britain | Oct. 27, 1941 |